United States Patent [19]

Simmons

[11] Patent Number: 4,959,154

[45] Date of Patent: Sep. 25, 1990

[54] METHOD FOR OIL SPILL CLEANUP

[76] Inventor: John J. Simmons, 220 Avenue "B" W., Bismarck, N. Dak. 58501

[21] Appl. No.: 336,687

[22] Filed: Apr. 12, 1989

[51] Int. Cl.$^5$ .............................................. C02F 1/28
[52] U.S. Cl. ....................................... 210/680; 134/7; 210/691; 210/924; 431/2
[58] Field of Search ..................... 134/7; 210/671, 680, 210/691, 242.4, 924; 431/2

[56] References Cited

PUBLICATIONS

*Oil Spill Intelligence Report*, vol. XII, No. 22, 25 May 1989 (An International Weekly Newsletter from Cutter Information Corp.).

*Primary Examiner*—Ivars Cintins
*Attorney, Agent, or Firm*—Vidas & Arrett

[57] ABSTRACT

Oil spills on water and land may be contained and cleaned by the process of applying wood chips in direct contact with the spilled oil. The wood chips are selected from the group consisting of air-dried, kiln-dried, hot wax-dried and hot oil-dried wood chips having a water content of less than about 30% by weight. The wood chips will float on water and attract the oil. The wood chips pick up oil at a ratio of about 3:1.

13 Claims, No Drawings

METHOD FOR OIL SPILL CLEANUP

BACKGROUND OF THE INVENTION

1. Field of the Invention

This invention relates to the containment, cleanup, collection and disposal of oil on water and land by using dried wood chips.

2. Description of the Related Art

In oil spills which contaminate water and land, the oil must be contained and removed as quickly and efficiently as possible to minimize the environmental impact. Previous procedures involved the use of floatable booms to contain the oil and the use of large rolls of oil-absorbent material. These rolls are used to blot up the oil and must be removed for later disposal. Complicated devices are used on the water to spread these large sheets over the polluted body of water.

Unfortunately, the equipment used to fight oil spills is difficult to handle and must be stored near a spill area. In bad weather, some of the methods are totally unworkable. The recent Exxon oil spill in Valdez, Ak. has shown the world that currently available processes do not work quickly or efficiently.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

SUMMARY OF THE INVENTION

The present invention use dried wood chips which readily float and absorb oil as a medium for containing and collecting spilled oil. The inventor has found that wood chips dried to a moisture level of less than about 35% by weight will float and absorb oil at a ratio of about one part oil to 3 parts chips. The absorption of oil is especially effective when the wood chips employed have been dried in a hot oil, hot wax or a combination thereof to a moisture content of less than about 20% by weight. The oil or wax in the dried chips prevents water from entering the wood chips and attracts the oil. This maximizes the chips' oil carrying capacity and ensures that the chips will remain floating for easy pick up.

The oil dried wood chips are also very easy to store since their low moisture content coupled with their oil and/or wax coating makes them resistant to rot and spoilage. Large quantities of oil dried wood chips may be stored near any oil handling facility in the event of a later spill.

After an oil spill, the dried wood chips are simply broadcast over the spilled oil. The oil coats the chips and stays intimately associated with the chips. Since the chips float, they are easily removed for later disposal. The oil saturated chips tend to agglomerate together which also makes cleanup easier. The oil soaked chips may be lifted out of the water, allowing the water to drain off. The resultant oil coated chips are an excellent fuel source and may be burned on site or removed for use by a utility.

DESCRIPTION OF THE PREFERRED EMBODIMENTS

Applicant has discovered that wood chips provide an excellent medium for oil attachment, containment and recovery. Tests have been conducted whereby sea salt water conditions were simulated and the salt water was placed in a three gallon plastic container. North Dakota, high paraffin, crude oil was added to the water in measured amounts. Tests were conducted to recover the oil from the water using a series of different types of wood chips, ranging from raw wood chips to wood chips that had been dried in hot 300° F. (149° C.) oil to wood chips that had been dried in hot 300°(149° C.) paraffin wax and further in a mixture of 50% vegetable oil(sunflower oil) and 50% wax. Various types of oil were used, including vegetable oil, mineral oil, crude oil, fuel oil ranging from No. 2 to No. 5, as well as paraffin wax and waste used oil. The chips tested were approximately 2"×1" in depth by ¼" thick, but also contained a series of sizes varying from ⅜" to 2" in width and length. The object of the test was to recover the oil with a floating wood chip medium, wherein the wood chips were placed on the oil spill and agitated to simulate wave conditions in the ocean. The oil attaches itself preferentially to the wood chips, and the wood chips and oil are subsequently removed from the container and placed in a second container for disposal.

It was discovered that raw, undried wood chips with a moisture content of less than about 35% will attract the oil and could be used under emergency situations. However, it is preferred that the wood chips be partially or wholly dried. The wood chips can be dried using standard methods as are known in the industry. The preferred method would be the wood chip drying method which utilizes hot oil or hot wax in the range from 250° to 350° F. (121° to 177° C.) as the liquid drying medium. The chips are placed into the hot oil medium for a period of time depending on the size and thickness of the chip, which varies from 3 minutes to 12 minutes.

The chips can be removed from the hot oil when more than 50% of the chips are still exiting water from the chip pores in the form stream. This allows some of the moisture to remain in the chips, but also prevents the chips from being totally saturated with oil. However, to allow better protection to the chips, it is preferred that the chips stay in the hot oil liquid until bubbling, agitating and steam ceases. The chips are virtually bone dry at this point and contain a protective coating of oil or wax which is on the surface and is absorbed into some of the pores of the chips. The chips retain their buoyancy and, in the fully dried condition, are easier to store for longer periods of time.

Preliminary studies were conducted on chips so produced have been stored for more than 24 months. Some of the chips were stored inside, but in unsealed containers, while additional chips were placed in a metal can with no cover and unprotected, except for drain holes in the bottom to allow any moisture collected due to rain or snow to escape. The chips stored inside showed no visible change in color, whereas the chips stored outside had a somewhat grayer appearance, but were still in sound condition.

It is preferred that the chips be dried in vegetable oil, such as sunflower oil, or a mixture of 50% sunflower oil, 25% corn oil, and 25% soybean oil. This provides a non-toxic wood chip material that can be safely placed on both water and land without environmental problems. These chips are in fact edible at this time and laboratory analysis shows that the chips contain a high amount of fat, and if poplar chips are used as the chip matrix, could be edible and digestible by animals, including cattle, horses and goats (see supporting work by L.ED. Kamstra, University of South Dakota, whereby dried poplar chips are fed to cattle). This is mentioned to cite that the chip processed in vegetable oil is compatible with the environment and food stream, and could safely be place don oceans, rivers, lakes and land without harm to animals or their environment.

Chips dried in 100% slack wax, a paraffin wax produced by Amoco Oil Company at their Casper, Wyo. refinery and which contains 11–13% oil also produced an acceptable product as did chips dried in 100% food grade paraffin wax. The wax coated chips repel water and attract oil.

OILSPILL RECOVERY TESTS

Test No. 1—Utilization of hot sunflower oil dried wood chips to remove oil from a spill of crude oil on salt water. A beaker of water and salt was prepared and cooled at 36° F. (2° C.). 290 grams of water and 10 grams of oil were added to the beaker. Sunflower dried wood chips were added slowly to the beaker and agitated. The oil covered chips were removed to a second recovery beaker. It was found that 31 grams of chips were required to remove 10 grams of oil. This is a basis of 3:1, chips to oil removed. Using oil having a specific gravity ranging from 0.9 to 0.98, it would require 12,000 tons of sunflower oil processed wood chips to remove approximately 1 million gallons of oil, or 1 ton of chips to remove 80 gallons of oil.

| Product | Weight | Percent Wt. |
| --- | --- | --- |
| H2O | 290 grams | 96.7% |
| Oil | 10 grams | 3.3% |
| TOTAL | 300 grams | 100.0% |

Thirty-one (31) grams of wood chips were added to recover 10 grams of oil.

Test No. 2—A repeat of the same conditions set forth in Test No. 1:

| Product | Weight | Percent Wt. |
| --- | --- | --- |
| H2O | 320 grams | 97.0% |
| Oil | 10 grams | 3.0% |
| TOTAL | 330 grams | 100.0% |

Thirty-two (32) grams of chips were required to remove 10 grams of oil. This represents a 3.2:1 ratio.

Test No. 3—Raw undried wood chips were used as the oil removing material under the same conditions as Test No. 1 and 2. It was observed during the test that the oil would attach itself to the surface of the chip, but not as well as to the dried chips. The raw wood chips had a moisture content of approximately 15%.

| Product | Weight | Percent Wt. |
| --- | --- | --- |
| H2O | 312 grams | 96.9% |
| Oil | 10 grams | 3.1% |
| TOTAL | 322 grams | 100.0% |

Forty-two (42) grams were placed in the oil and agitated to remove the 10 grams of oil. The ratio of chips to picked up oil was 4.2:1. It was noted that two of the wood chips sank to the bottom, as they were waterlogged.

Test No. 4—Tests No. 1, 2, 3 were repeated using wood chips that were air dried to a moisture content of about 25%.

| Product | Weight | Percent Wt. |
| --- | --- | --- |
| H2O | 296 grams | 96.7% |
| Oil | 10 grams | 3.3% |
| TOTAL | 306 grams | 100.0% |

Thirty-eight (38) grams of wood chips were added slowly to the oil water moisture in order to remove 10 grams of oil. The ratio of chips to oil removed was 3.8:1.

In all cases, the bulk of the oil was removed. It is estimated that 99% of the oil was removed by the process. The sunflower oil dried chips removed more of the last films of oil than the undried and air dried chips.

Test No. 5—Utilization of hot paraffin wax dried wood chips to remove oil from a spill of crude oil on salt water. A beaker of water similar to Test No. 1 was prepared containing water and salt and cooled by the Addition of ice to 36 F. (2 C.). 350 gms of water and 15 grams of crude oil were added to the beaker. Paraffin wax dried wood chips were added slowly to the beaker and agitated. The oil covered chips were removed to a secondary recovery beaker. It was found that 42 grams of chips were required to remove 15 grams of oil. This is ratio of 2.8 to 1.

Test No. 6—A test tank was set up wherein North Dakota paraffin crude oil was placed in salt water in the test tank. One standard gallon of crude oil was placed in the tank, which was placed outside. Ice was added to the water to set up an initial temperature of 36° F. (2° C.). The oil was added to the cold salt water and allowed to remain for 72 hours in the outdoors and in the daylight sunshine. By the end of the first day, the oil had thickened considerably and continued to thicken through the third day.

Approximately 30 lbs. of sunflower oil dried wood chips were added to the surface of the partially thickened oil. The tank was agitated for 10 minutes to simulate fairly heavy sea wave conditions. The oil broke up into small particles and attached themselves to the chips so that the surface was now covered with chips with oil attached to the chips. The chips were removed with a shallow scoop-like device with a 3/16" square screen opening. The chips were scooped from the surface of the water and placed in a receiving barrel. Approximately 98–99% of the oil was recovered with the remaining oil forming a very light oil film. The two drops of detergent were added to the surface of the water and film. This caused the oil film to disperse, part of which attached itself to 10 chips placed on the water surface. This system would be suitable for cleaning up small traces of oil left in the water.

Test No. 7—500 grams of crude oil were placed in 3 gallon pan of salt water @ 36° F. (2° C.) and left to age for 96 hours. The thick "chocolate mousse" like oil and water was dumped on 2 rock filled test bed. Wax dried Chips were placed and moved around by rakes. About 50% of the oil attached to the chips and removed by a vacuum suction hose. Additional chips were added to the oil coated rocks and mixed by raking. A butane torch was used to ignite the oil coated chips. The chips ignited easily and burned well, leaving a small amount of ash and a few charred chips. This test simulated the cleanup of an oil soaked rocky beach. The oil was 90% or more removed in the above described two stages.

An alternative to vacuum suction would be to place and work the chips into the oil soaked beach at low tide, then let the tide raise the oil soaked chips up and carry them into the water where they could be recovered by a suction dredge suction pump or by a wood chip recovery device known in the industry.

A similar series of tests were run using oil processed with crude oil, No. 2 fuel oil, No. 5 fuel oil, common mineral oil, 100% soybean oil, 100% sunflower oil 100% paraffin wax and a blend of 50% wax and 50% sunflower oil and used crank gear oil. Oil was collected and recovered from the surface of the water in each case. It appeared that the vegetable oil-treated chips and the wax treated would be the most suitable for a spill cleanup material. There was very little difference in the ability of the chips to attract oil as long as they were first dried in the oils and/or wax to a low moisture content. Vegetable oil or wax dried chips would be preferred from the handling standpoint as they are cleaner to handle and would present less of an environmental problem.

Approximately 5 lbs. of sunflower oil dried chips were placed on a slightly sloping 10% earth embankment to provide a dam at the bottom of the embankment. Eight ounces of North Dakota petroleum crude oil was added 3 feet up slope to allow the oil to run down into the wood chip dam. The surface of the earth was packed so that the penetration of the earth was minimal. It was found that the chips, which ranged in size from 20 mesh to 2", provided a dam that slowed the oil down and filtered the oil. Less than 1 ounce of oil passed through the chip barrier, indicating a recovery of approximately 90%.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for containment and collection of oil on a surface comprising the steps of:
   (a) placing wood chips in contact with oil on said surface, said wood chips being selected from the group consisting of hot-oil dried wood chips having a water content of less than about 30% and an oil content of between about 1 to about 25% by weight, and hot-wax dried wood chips having a water content of less than about 20% and a wax content between about 1 and 25% by weight; and
   (b) allowing said wood chips to pickup said oil.

2. The method of claim 1 further including the step of collecting the now oil-saturated wood chips from the surface which had been coated with oil.

3. The method of claim 2 further including the step of utilizing the oil-saturated wood chips for fuel.

4. The method of claim 1 wherein said oil-saturated wood chips are disposed of by igniting and burning said chips on said surface.

5. The method of claim 1 wherein said oil-saturated chips are disposed of by igniting the chips in a combuster away from said surface.

6. A method for cleaning an oil spill comprising the step of:
   (a) placing wood chips in contact with spilled oil, said wood chips having been previously dried in hot oil to a water content of less than about 20% and an oil content of between about 10%–25% by weight.

7. The method of claim 6 further including the step of:
   (b) igniting said wood chips after said wood chips become saturated with said spilled oil, such that said wood chips and spilled oil are consumed on site.

8. The method of claim 7 wherein said wood chips are dried in a paraffin oil or wax to increase the combustibility of the wood chips after saturation with said spilled oil.

9. The method of claim 6 further including the step of (b) removing the oil soaked chips by a vacuum suction device.

10. The method of claim 6 further including the step of (b) removing the oil soaked chips by scoop or shovel.

11. The method of claim 6 including the step (b) washing the oil saturated chips from an oil contaminated beach back into the water, such that said oil saturated chips may be more readily recovered.

12. The method of claim 6 including the step of (b) allowing a new tide to float said oil-saturated wood chips from an oil contaminated beach, such that said chips with oil may be recovered from the surface of the water.

13. A method of cleaning an oil spill on water comprising the steps of:
   (a) placing wood chips in contact with said spilled oil, said wood chips being utilized in a ratio of at least two parts wood chips to oil by weight, said wood chips being dried in hot oil to a water content of less than about 30% and an oil content of between about 1%–25% by weight;
   (b) allowing said wood chips to pick up said oil; and
   (c) collecting said oil-coated wood chips from the water surface.

* * * * *